United States Patent
Corder et al.

(10) Patent No.: US 9,395,386 B2
(45) Date of Patent: Jul. 19, 2016

(54) ELECTRONIC TILT COMPENSATION FOR DIAPHRAGM BASED PRESSURE SENSORS

(71) Applicant: Dwyer Instruments, Inc., Michigan City, IN (US)

(72) Inventors: Rodney Corder, Chesterton, IN (US); Daniel A. Heuer, New Carlisle, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 539 days.

(21) Appl. No.: 13/826,513

(22) Filed: Mar. 14, 2013

(65) Prior Publication Data

US 2014/0260516 A1    Sep. 18, 2014

(51) Int. Cl.
   *G01P 21/00*   (2006.01)
(52) U.S. Cl.
   CPC ..................................... *G01P 21/00* (2013.01)
(58) Field of Classification Search
   USPC ........................................................... 73/715
   See application file for complete search history.

(56) References Cited

U.S. PATENT DOCUMENTS

| | | |
|---|---|---|
| 6,510,741 B2 | 1/2003 | Condrea et al. |
| 7,331,209 B2 * | 2/2008 | Saari .......................... G01L 1/26 |
| | | 73/1.08 |
| 2011/0239772 A1 * | 10/2011 | Kurtz .................... G01L 13/025 |
| | | 73/721 |

* cited by examiner

*Primary Examiner* — Hezron E Williams
*Assistant Examiner* — Mark A Shabman
(74) *Attorney, Agent, or Firm* — Tarolli, Sundheim, Covell & Tummino LLP

(57) ABSTRACT

System, apparatus and method for providing corrective sensor outputs, particularly when a sensor is subject to gravitational or acceleration effects. A sensor and accelerometer may be operatively coupled to a processor, wherein the processor receives inputs from both. The processor receives the sensor signals and determines the gravitational or acceleration effects on the sensor from the accelerometer signals. Based on these, the processor determines a correction factor that is applied to the sensor signals to provide improved and more accurate sensor outputs.

10 Claims, 4 Drawing Sheets

ELECTRONIC TILT COMPENSATION FOR DIAPHRAGM BASED PRESSURE SENSORS

TECHNICAL FIELD

The present disclosure is directed to techniques for improving operation of sensors. More specifically, the disclosure is directed to techniques for improving operation of pressure sensors that comprise diaphragms, or any similar element adapted for pressure sensing.

BACKGROUND INFORMATION

Sensors have long been used in the art to sense and measure a variety of environmental and/or physical states. Certain sensors, such as capacitive sensors, have been particularly advantageous for having the capability to directly measure a variety of states, such as motion, chemical composition, electric field, etc., and, indirectly, sense many other variables that may be converted into motion or dielectric constants, such as pressure, acceleration, fluid level, fluid composition and the like. Additional applications for capacitive sensors include flow measurement, liquid level, spacing, scanned multiplate sensing, thickness measurement, ice detection, and shaft angle or linear position.

In order to accurately measure low pressures, sensors require fairly large diaphragms to provide the accuracy required. The deflection of these diaphragms is measured to determine the pressure differential on either side of the diaphragm. Unfortunately, these large diaphragms are also sensitive to orientation as gravity can have a significant effect (up to 2% change, or 0.5 Pa on a 25 Pa sensor). For fixed installations, the diaphragms of these sensors are always oriented parallel to the gravity vector, eliminating the need for compensation. For portable applications, however, the orientation cannot be guaranteed, and a method for compensation is required.

The current approach for orientation compensation is to provide 2 sensors, oriented 180° from each other, such that the gravity effects are equal and opposite between the two sensors. The output of the two sensors ($P_{Sensor1}$ and $P_{Sensor2}$) are averaged ($P_{avg}$), and the errors introduced by gravity ($E_g$) are essentially cancelled out:

$$P_{avg} = \frac{(P_{sensor1} + E_g) + (P_{sensor2} - E_g)}{2}$$

One of the biggest problems with this approach is that it requires two relatively expensive sensors in order to provide the orientation independence. The sensing costs are twice that of a single sensor implementation. Additionally, if the sensors are not matched (e.g., in diaphragm thickness and tension), each sensor will have a different error induced by gravity, introducing a resultant error after the averaging, which cannot otherwise be compensated. Thus, by combining two sensors, the inaccuracy components of non-repeatability and hysteresis will become cumulative in the two sensors, causing an overall decrease in the accuracy of the combined sensors over that of each of the individual sensors. Accordingly, improved techniques, systems and methods are needed to provide more accurate readings.

BRIEF SUMMARY

As such, in one exemplary embodiment, a processor-based method is disclosed for producing a corrected sensor signal, where the method comprises receiving at least one sensor signal representing an environmental characteristic, and receiving one or more accelerometer signals, wherein the accelerometer signals correlate to different orientations of a sensor producing the sensor signal. The method further comprises the step of producing the corrected sensor signal, wherein said corrected sensor signal is based at least in part on processing the at least one sensor signal and the one or more accelerometer signals. In another embodiment, the corrected sensor signal comprises the processing of a z-component of a gravity vector (i.e., a component of acceleration normal to the sensitive plane of the sensor) from at least one of the accelerometer signals to determine a gravitational offset or acceleration offset, and may also comprise a normalized value of the at least one of the accelerometer signals. As will be discussed in greater detail below, the corrected sensor signal ($O_{corr}$) may advantageously be produced via the at least one sensor signal ($O_{meas}$), the normalized value ($Z_{NORM}$), and offset ($K_G$) according to $O_{corr} = O_{meas} - Z_{NORM} * K_G$. In yet other embodiments, the environmental characteristic comprises pressure, and the sensor signal may represent pressure produced from a conductive diaphragm.

In another exemplary embodiment, a system is disclosed for producing a corrected sensor signal, wherein the system comprises a sensor configured to produce at least one sensor signal, where the sensor signal represents an environmental characteristic. The system may also comprise an accelerometer configured to produce one or more accelerometer signals being correlated to different orientations of the sensor, and a processor, operatively coupled to the sensor and accelerometer, wherein the processor may be configured to produce the corrected sensor signal based at least in part on processing the at least one sensor signal and the one or more accelerometer signals.

In yet another exemplary embodiment, a processor-readable medium containing program instructions for producing a corrected sensor signal is disclosed, wherein execution of the program instructions by one or more processors of a computer system causes the one or more processors to carry out the steps of: receiving at least one sensor signal, said sensor signal representing an environmental characteristic; receiving one or more accelerometer signals, said accelerometer signals correlating to different orientations of a sensor producing the sensor signal; and producing the corrected sensor signal, wherein said corrected sensor signal is based at least in part on processing the at least one sensor signal and the one or more accelerometer signals.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
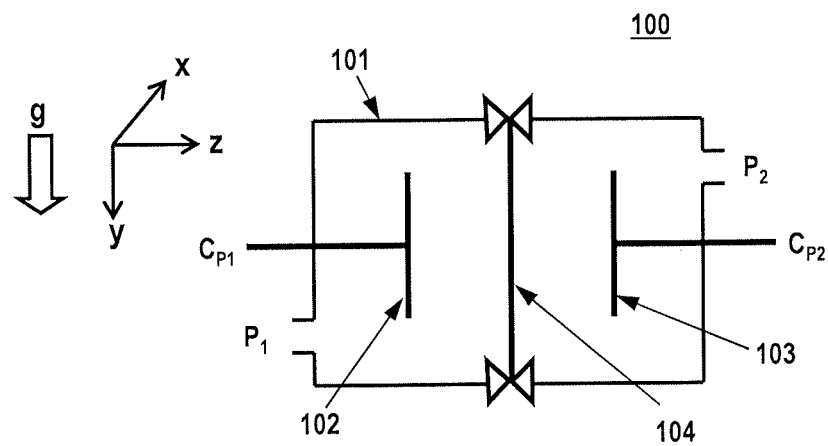
FIG. 1A illustrates one orientation of a sensor under one exemplary embodiment.
Figure 1B:
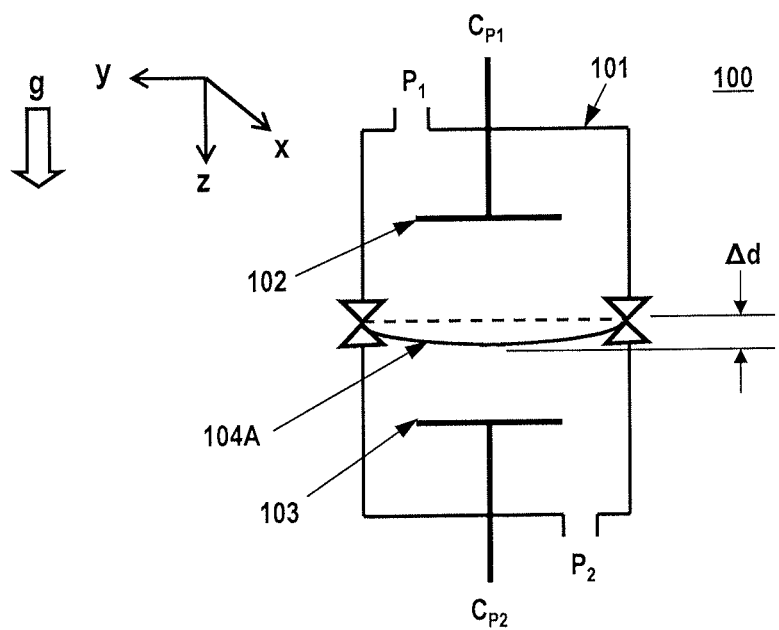
FIG. 1B is another orientation of the sensor of FIG. 1A, illustrating an exemplary gravitational effect on the sensor.

FIG. 1A illustrates a cut-away view of an exemplary capacitance-based pressure sensor 100 comprising a housing 101 including pressure ports $P_1$, $P_2$, and a diaphragm 104 positioned between two electrodes (102, 103). Here, gravity vector (g) is oriented along the diaphragm 104 (y-axis). In the present embodiment, it is assumed that the pressure is equalized ($P_1=P_2$), along with the capacitance ($C_{P1}=C_{P2}$). When sensor 100 is rotated 90° (FIG. 1B), the gravity vector (Z) oriented along the z-axis may have an effect on the diaphragm, causing it to bend 104A in the direction of the vector. The resulting deflection (Δd) leads to erroneous readings by the sensor, based at least in part on the error induced by gravity $E_g$. As a result, even under an equalized pressure condition ($P_1=P_2$), the difference in capacitance becomes $C_{P1}+E_g=C_{P2}-E_g$. It can be seen that the gravitational effect will positively affect one side of the differential pressure measurement, and negatively affect the other side.

Figure 1C:
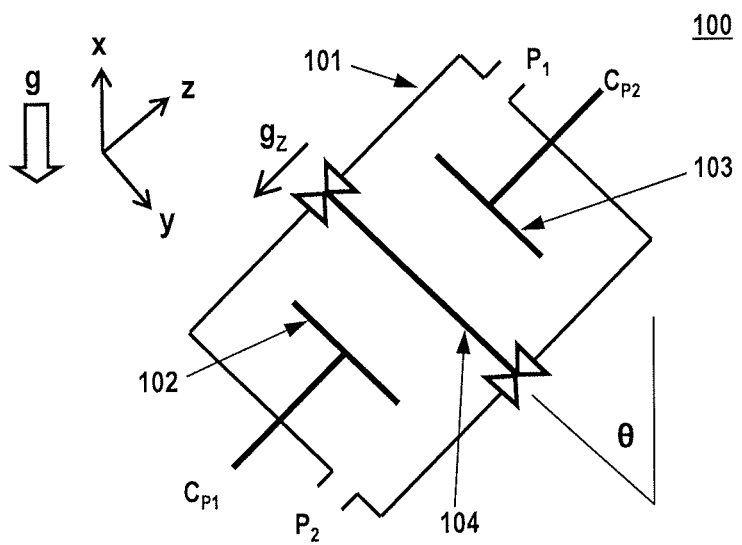
FIG. 1C illustrates yet another orientation of the sensor of FIG. 1A.

In other orientations, such as the one illustrated in FIG. 1C, the gravitational effect will be affected by the angle θ at which sensor 100 is oriented. Depending on the specific angle of orientation (tilt), the gravitational effect of a vector $g_z$ normal to diaphragm 104 may nevertheless be determined using $g_z=g*\sin(\theta)$. In order to provide tilt compensation, a configuration is used to determine the z-component of gravity ($g_z$), and the effects of gravity on the diaphragm ($E_g$). Using an accelerometer, that may be configured to be sensitive in the z-direction of the diaphragm, the effect of $g_z$, as seen by the diaphragm, may be determined. Under one embodiment, a microelectromechanical system (MEMS) accelerometer is used to this end; as can be appreciated by one skilled in the art, an accelerometer is significantly less expensive than a high-quality pressure sensor. Under this embodiment, a MEMS accelerometer measures the gravity effect in the z-axis (i.e., normal to the plane of the diaphragm) in order to develop correction coefficients or factors to offset the influence of gravity on the output, maintaining accuracy independent of orientation. It should be understood by those skilled in the art that the use of MEMS accelerometers is but one example for the present disclosure, and that any other suitable accelerometer or device capable of measuring orientation may be used.

$E_g$ and $g_z$ may be directly measured during the calibration process when the diaphragm is oriented orthogonally to the gravity vector. The correction or compensation factor ($P_{comp}$) may be determined from the output of the sensor according to $$P_{comp}=P_{meas}-g_z*E_g \quad (1)$$

which should hold for different orientation. While it is possible to compensate for vibration with the above techniques, differences in inertia between the sensor diaphragm and the MEMS accelerometer may need to be taken into account. As is known in the art, a high-accuracy low pressure sensor requires a very consistent diaphragm response. This would mean that the spring constant of the diaphragm would need to be uniform over the entire deflection of the diaphragm. However, because of this, $E_g$ is relatively insensitive to the applied pressure and would not require an additional term in (1) to compensate for the pressure.

Figure 2:
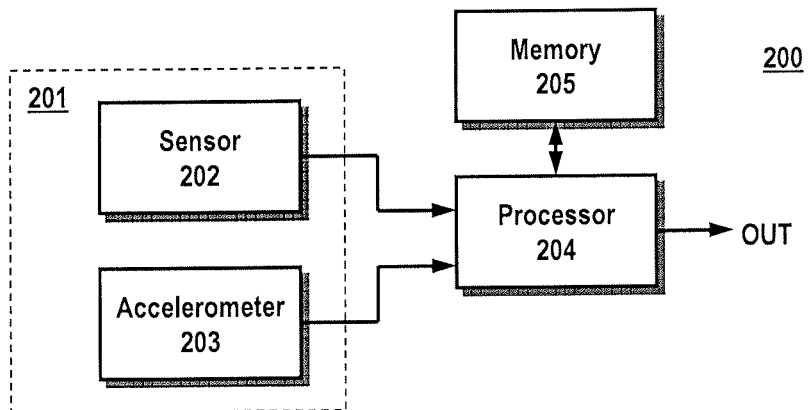
FIG. 2 illustrates an exemplary processor-based system for producing corrective sensor outputs.

FIG. 2 illustrates an exemplary embodiment of a compensated sensor arrangement 200, comprising a pressure sensor 202 and accelerometer 203, which may be mounted or otherwise coupled to accelerometer 201 in a common housing 201. In an alternate embodiment, sensor 202 and accelerometer 201 are located in separate housings. Outputs of sensor 202 and accelerometer 203 are respectively transmitted to processor 201, which processes both outputs to determine a compensation factor, which is used using any of the techniques described herein to produce a corrected output (OUT). In one embodiment, processor 204 may be an application-specific integrated circuit (ASIC) comprising field-programmable devices, such as field-programmable gate arrays (FPGAs) that can be programmed with specific algorithms by a user, thus offering minimal tooling charges and non-recurring engineering costs. Processor 204 may be separately positioned from sensor 202 and accelerometer 203, integrated with either or both, and further may be configured to be within housing 201 as part of a computer system. In another embodiment, processor 204 may be a part of another circuit in the computer system, such as a capacitance-to-digital (C/D) converter. Processor 204 is also preferably coupled to a memory 205 for storing and/or retrieving processor outputs and other data. It is understood by those skilled in the art that multiple different configurations are possible given the present disclosure.

It should be noted that, because of sensor construction, the gravitational effect of one orientation of the diaphragm (e.g., 1 G) will not be identical to another orientation (e.g., -1 G) of the diaphragm. This unequal effect may be due to a number of reasons, such as the mounting of the diaphragm, and the sensing mechanisms for the diaphragm position. Accordingly, different correction coefficients may be used for positive and negative influences of gravity. These correction coefficients are preferably determined during a calibration process, although it should be understood by those skilled in the art that correction coefficients may be determined at other times as well.

For manufacturing purposes, it is advantageous to maintain a minimum of calibration and orientation steps in order to provide the correction. Under one embodiment, a zero pressure reading is taken with the plane of the diaphragm parallel to gravity. Subsequently, the diaphragm may be oriented normal to gravity in the positive and negative directions. For the purposes of this embodiment, it may be assumed that gravity is locally constant, and can be normalized to 1 G. While the exact local gravity may not be exactly 1 G, accelerometer readings should be proportional to the actual local gravity and readings will translate from place-to-place, which should allow correction coefficients to maintain proportionality.

For the calibration process, it is not uncommon for factory-produced accelerometers to contain small offsets and minor orientation effects will cause scale and offset shifts in the reading. To compensate for this, accelerometers are advantageously normalized out in the calibration process under one embodiment. Since only a single sensor is used (as opposed to two sensors under the prior art), the overall components of the sensor inaccuracy, such as non-linearity, nonrepeatability and hysteresis, do not increase with the correction.

Figure 3:
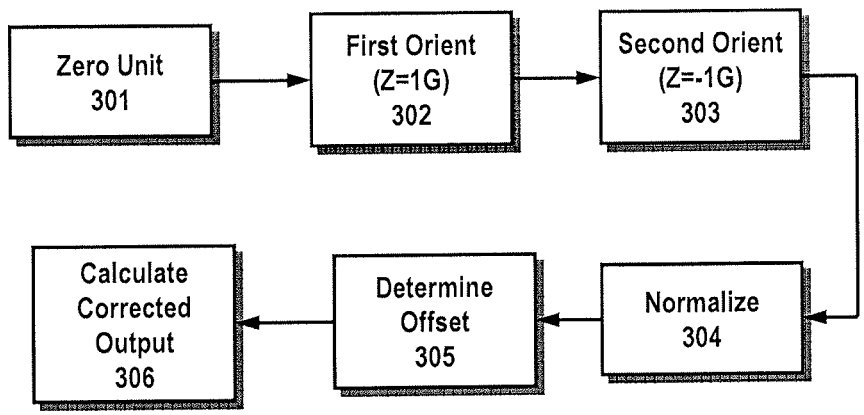
FIG. 3 illustrates an exemplary method for processing and determining a corrective sensor output under one embodiment.

Turning to FIG. 3, an exemplary method is illustrated for calibrating a sensor configuration (such as the one disclosed above in connection with FIG. 2) to produce a corrected output. One exemplary algorithm for producing a corrected output uses an output of a pressure sensor or transmitter that is representative of the applied pressure, or O=f(P), where f(P) is a linearization function that transforms the measured pressure into the electronic output of the sensor or transmitter. Ideally, a pressure sensor produces a linear output, such that O=kP; however, in the case of larger-diaphragm sensors for low pressure, the output may not be strictly linear.

An accelerometer provides an output comprising a measurement of the Z component of the gravity vector (Z), and the output should be equivalent to $g_z$ described above. Rather than confuse the actual Z-component of gravity vector $g_z$ with the accelerometer measurement, Z is used because the absolute accuracy of the accelerometer is not perfect, and would need adjustment. Accordingly, in step 301, the sensor/accelerometer unit is zeroed in a neutral orientation (Z=0 G), and an output of the sensor ($O_{0G}$) is measured and stored. In step 302, the sensor unit is positioned in a first orientation (e.g., Z=1 G), and the output of the accelerometer ($Z_{1G}$) and sensor ($O_{1G}$) are measured and stored. In step 303, the sensor unit is positioned in a second orientation (e.g., Z=−1 G), and the output of the accelerometer ($Z_{m1G}$) and sensor ($O_{m1G}$) are again measured and stored.

In step 304, a normalization process is performed to normalize scale/offset from the accelerometer to adjust for initial calibration errors. One exemplary normalization process for a measured accelerometer output ($Z_{MEAS}$) may be expressed as $$Z_{NORM} = \frac{2}{Z_{1G} - Z_{m1G}} * Z_{MEAS} - \frac{(Z_{1G} + Z_{m1G})}{2}.$$

In step 305, processor 204 calculates a correction offset in both the first (1 G) and second (−1 G) orientation. It should be noted that, during actual operation, the diaphragm/electrode motion will typically be asymmetric due to capacitance changing as a function of 1/d. Accordingly to determine offset $K_G$, For $Z_{NORM} \geq 0$ $$K_G = (O_{1G} - O_{0G})$$

For $Z_{NORM} < 0$ $$K_G = (O_{0G} - O_{m1G}).$$

Using this, in step 304, a corrected output $O_{corr}$ is calculated according to $O_{corr} = O_{meas} - Z_{NORM} * K_G$, which correlates to equation (1) discussed above.

Figure 4:
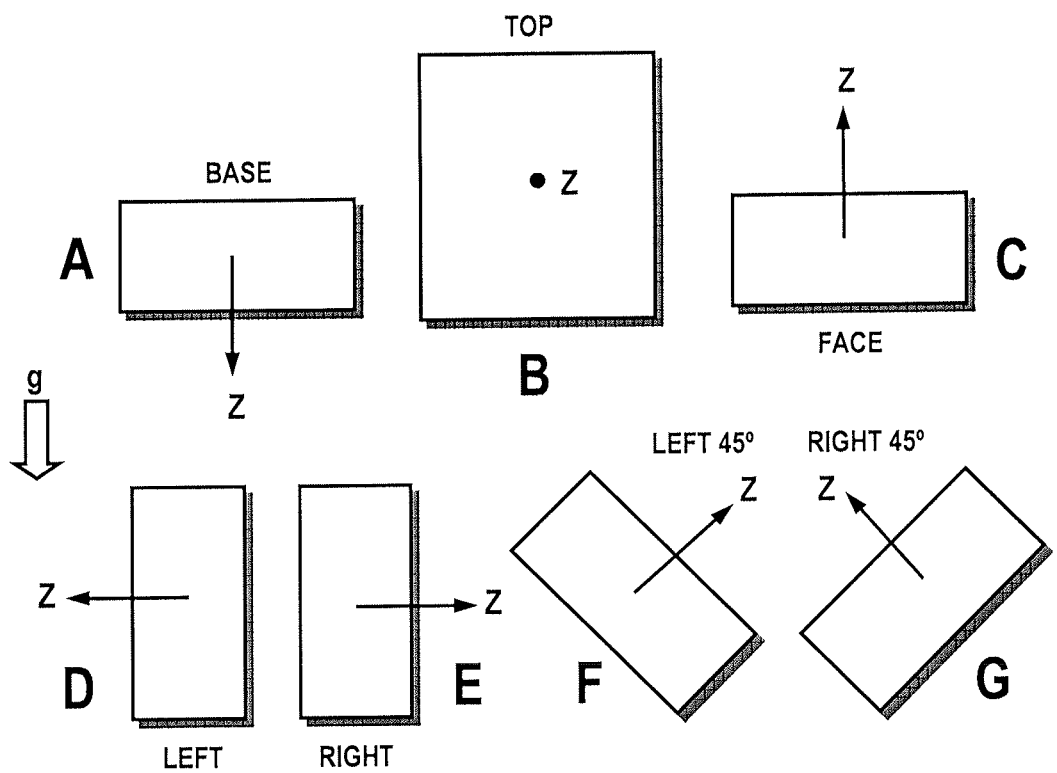
FIGS. 4A-G illustrate different orientations for a sensor where corrected sensor outputs are to be determined.

The correction/compensation techniques above may be further illustrated by FIG. 4, where seven exemplary sensor unit orientations are shown, where the Z vector is indicated by an arrow in each respective figure. The seven orientations include a base orientation (FIG. 4A), top (FIG. 4B), face (FIG. 4C), left (FIG. 4D), right (FIG. 4E), left 45° (FIG. 4F) and right 45° (FIG. 4G). In the embodiment of FIG. 4B, the Z vector should be viewed as being perpendicular to the surface (i.e., arrow pointing towards the reader). For each of these orientations, the accelerometer measurements for each axis ($X_{meas}$, $Y_{meas}$, $Z_{meas}$) and accelerometer output ($O_{meas}$, note: ideal output=5.000) were recorded, and full-scale (FS) error percentages were determined. By performing the normalization ($Z_{norm}$) and correction ($O_{corr}$) steps described above, it was found that the corrected full scale output was significantly more accurate. The results are illustrated in Table 1, below:

TABLE 1

|  | Base | Top | Face | Left | Right | Left 45* | Right 45* |
| --- | --- | --- | --- | --- | --- | --- | --- |
| $X_{meas}$ | 0.000 | −1.001 | 0.007 | 0.063 | 0.071 | 0.060 | −0.070 |
| $Y_{meas}$ | 0.010 | 0.059 | −0.010 | 1.001 | −1.001 | 0.918 | −0.928 |
| $Z_{meas}$ | 1.018 | 0.049 | −0.991 | 0.004 | 0.019 | −0.386 | −0.362 |
| $O_{meas}$ | 4.8711 | 4.9829 | 5.0853 | 4.9847 | 4.9867 | 5.0258 | 5.0275 |
| error % FS | −1.29% | −0.17% | 0.85% | −0.15% | −0.13% | 0.26% | 0.27% |
| $Z_{norm}$ | 1.00 | 0.04 | −1.00 | −0.01 | 0.01 | −0.40 | −0.37 |
| $O_{corr}$ | 4.98 | 4.99 | 4.98 | 4.98 | 4.99 | 4.99 | 4.99 |
| corr % FS | −0.15% | −0.13% | −0.15% | −0.16% | −0.13% | −0.14% | −0.10% |

An exemplary pressure sensor/transmitter configuration includes an Alpha Instruments model no. 168P0025BC1NA, having an output of 0-10$V_{DC}$, a range of ±25 Pa and accuracy of 1.0% FS. The accelerometer may comprise a Phidgets part no. 1049, sometimes referred to as "Phidget Spatial 0/0/3." Another result from a different sensor/accelerometer configuration is illustrated in Table 2:

TABLE 2

|  | Base | Top | Face | Left | Right | Left 45* | Right 45* |
| --- | --- | --- | --- | --- | --- | --- | --- |
| $X_{meas}$ | −0.002 | −0.998 | 0.001 | 0.028 | −0.022 | 0.027 | −0.006 |
| $Y_{meas}$ | 0.013 | 0.022 | −0.002 | 1.004 | −1.004 | 0.917 | −0.932 |
| $Z_{meas}$ | 1.018 | 0.035 | −0.988 | 0.008 | 0.028 | −0.391 | −0.361 |
| $O_{meas}$ | 4.9205 | 5.0212 | 5.1239 | 5.0187 | 5.0158 | 5.0568 | 5.0575 |
| error % FS | −0.80% | 0.21% | 1.24% | 0.19% | 0.16% | 0.57% | 0.58% |
| $Z_{norm}$ | 1.00 | 0.02 | −1.00 | −0.01 | 0.01 | −0.40 | −0.37 |
| $O_{corr}$ | 5.02 | 5.02 | 5.02 | 5.02 | 5.02 | 5.01 | 5.02 |
| corr % FS | 0.19% | 0.23% | 0.19% | 0.18% | 0.17% | 0.14% | 0.18% |

Figure 5:
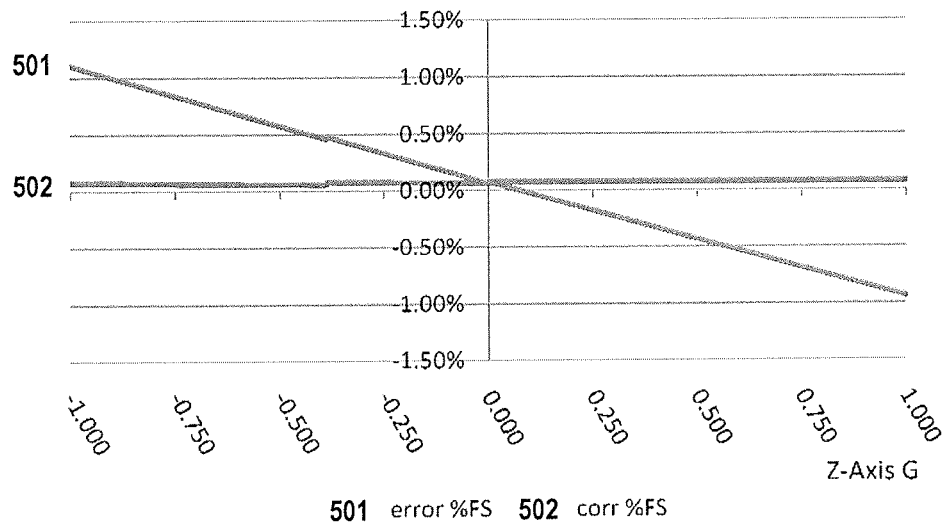
FIG. 5 is an exemplary graph illustrating the corrective effects on a sensor employing certain techniques disclosed herein.

It can be seen that the techniques described herein result in significantly more accurate sensor outputs. This point is further illustrated in FIG. 5, which is an exemplary graph of the uncorrected (501) and corrected (502) sensor outputs along nine orientations between −1 G and 1 G, shown on the Y-axis. As the sensor unit orientation approaches −1 G or 1 G, the graph demonstrates that the level of compensation increases, resulting in a relatively consistent accuracy level (502), regardless of orientation. It should be noted that in the embodiment of FIG. 5, the zero offset error of the sensor/transmitter was not factored into the correction, so the constant offsets in the corrected errors was a result of the zero offset of the calibrated sensor/transmitter. It should be also understood by those skilled in the art that, while a specific number and types of orientations were used in the present disclosure to determine correction factors, other practitioners may choose to do greater or fewer orientations, depending on their needs and applications.

Accordingly, it can be seen that by determining the direction and influence of gravity, and making a preferably linear accommodation for it may result in a significant improvement in the output accuracy of a sensor/transmitter. And while the techniques described herein are particularly advantageous for a capacitive-based cell, the techniques may work equally as well with any diaphragm based pressure sensor or any other sensor where sensing elements are affected by gravity. Furthermore, it should be appreciated by those skilled in the art that the present disclosure is not strictly limited to diaphragm pressure sensors, but may be applied to other configurations as well. For example, certain sensors are configured to operate with a diaphragm that moves a magnetic element on the end of a beam, where the beam is a leaf-spring having one end fixed to a housing and a magnet on a far end. During operation, the diaphragm pushes/pulls the middle of the beam, causing the magnet to move substantially in the direction of the diaphragm, under the influence of a multiplier effect. The position of the magnet is determined via a Hall sensor, which in turn is converted to an electrical signal indicating pressure. In other examples, the accelerometer techniques may be used with any sensing element that is orientation-sensitive, where the effect of gravity would cause a measurable effect, such as Bourdon tubes and bellows, although bellows may require additional non-linear corrections due to the non-linearity of their physical operation.

Figure 6:
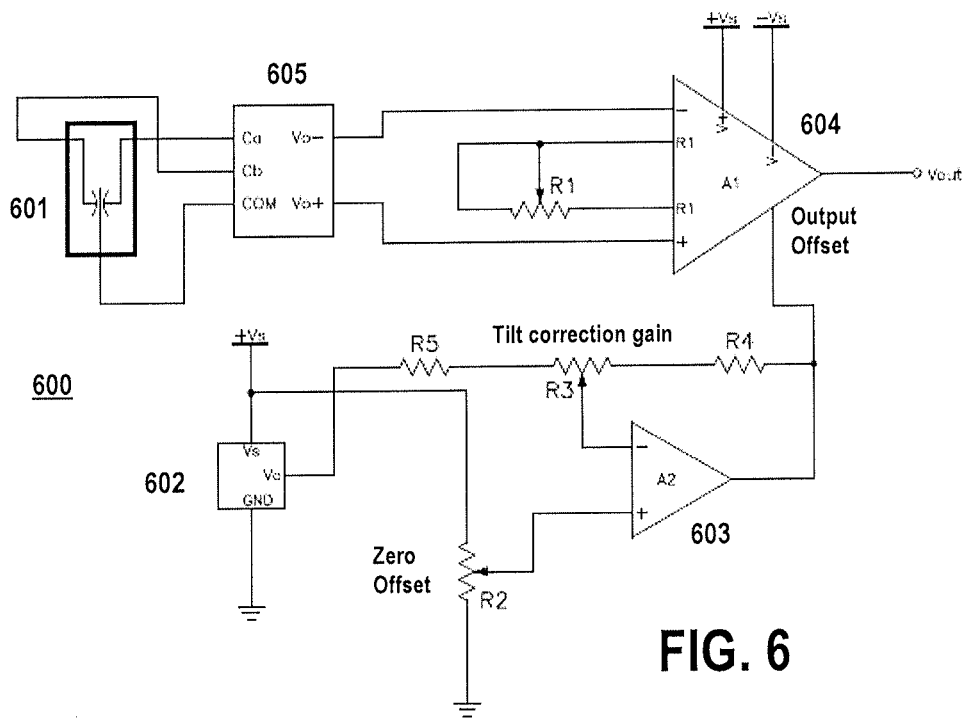
FIG. 6 illustrates an exemplary circuit-based system for producing corrective sensor outputs under another embodiment.

While certain embodiments described above provide various systems, apparatuses and methods for providing tilt compensation in the digital domain, it should be understood that digital circuitry is merely a preferred embodiment. Accordingly, many of the techniques described herein may be accomplished using analog circuitry, where signal processing may be enabled via analog circuit elements. Of course, a combination of digital and analog circuitry is also possible under the present disclosure. Turning to FIG. 6, an exemplary circuit arrangement 600 is illustrated, comprising a capacitive sensor 601, which provides outputs ($C_a$, $C_b$) from each electrode to capacitance to voltage converter 605, which comprises a COM terminal operatively coupled to a diaphragm of sensor 601. Converter 605 provides a positive ($V_{o+}$) and negative ($V_{o-}$) output to instrumentation amplifier 604. Amplifier 604 further comprises a variable gain input controlled by variable resistor R1. By adjusting the resistance of R1, the voltage span of capacitance-to-voltage converter 605 may be controlled.

Accelerometer 602 is coupled to operating voltage line $+V_S$, which is further coupled to positive input terminal (+) of operational amplifier 603 via variable zero offset resistor R2. The output of accelerometer ($V_o$) is operatively coupled to negative input terminal (−) of amplifier 603 via current resistor R5 and tilt correction variable resistor R3. The output of amplifier 603 is fed into instrumentation amplifier 604, and is further arranged in a feedback loop to negative terminal (−) via resistor R4. Here, accelerometer 602 provides an output representing a Z component; as discussed above, accelerometer 602 may be zeroed in a neutral orientation (Z=0 G), and an output of the sensor is measured. Additionally, measurements may be taken from a first orientation (e.g., Z=1 G) and a second orientation (e.g., Z=−1 G). Resistor R2 may be used for a normalization process to normalize scale/offset from the accelerometer to adjust for initial calibration errors and determine $Z_{NORM}$. Using resistor R3 for tilt correction gain, a correction offset may be determined for both the first (1 G) and second (−1 G) orientations. Using this, a corrected output $O_{corr}$ may be generated from amplifier 604, similar to the embodiments discussed above.

While at least one example embodiment has been presented in the foregoing detailed description, it should be appreciated that a vast number of variations exist. For example, while gravity effects were described in certain embodiments as constant acceleration, embodiments utilizing dynamic acceleration are contemplated as well, where static gravity components and dynamic non-gravity components may be utilized. Such a configuration would be advantageous in dynamic environments (e.g., moving vehicle, handheld applications, etc.). It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A pressure measuring system for providing a corrected pressure that accounts for pressure sensor orientation, the system comprising:
    a pressure sensor comprising a diaphragm configured to deflect in response to pressure acting on the diaphragm, the pressure sensor producing a measured pressure signal in response to diaphragm deflection;
    an accelerometer configured to measure a component of gravity acting normal to the diaphragm and to produce an accelerometer signal indicative of the measured gravity component; and
    a processor operatively connected with the pressure sensor and the accelerometer to receive the measured pressure signal and the accelerometer signal, the processor being configured to determine the corrected pressure by applying a first compensation to the measured pressure to account for the effects of gravity on the diaphragm when the measured gravity component acts in a first direction normal to the diaphragm, the processor being further configured to determine the corrected pressure by applying a second compensation to the measured pressure to account for the effects of gravity on the diaphragm when the measured gravity component acts in a second direction normal to the diaphragm and opposite the first direction.

2. The system recited in claim 1, wherein the processor is configured to apply the first and second compensations by adjusting the measured pressure signal by a function of an offset value, wherein the offset value is determined according to a first calculation when the measured gravity component acts in the first direction, and wherein the offset value is determined according to a second calculation when the measured gravity component acts in the second direction.

3. The system recited in claim 1, wherein the accelerometer is configured such that the measured gravity component is positive when acting in the first direction and negative when acting in the second direction.

4. The system recited in claim 1, wherein the sensor is configured such that the diaphragm is positioned in a plane defined by an X-axis and a Y-axis, and the accelerometer is configured to measure the gravity component along a Z-axis that extends perpendicular to both the X-axis and Y-axis.

5. The system recited in claim 1, wherein the processor is configured to determine the corrected pressure ($O_{corr}$) by compensating the measured pressure ($O_{meas}$) by a function of the offset value ($K_G$) and a normalized measured gravity component value ($Z_{NORM}$), according to: $O_{corr}=O_{meas}-Z_{NORM}*K_G$.

6. The system recited in claim 5, wherein the processor is configured to calculate the normalized measured gravity component $Z_{NORM}$ according to:

$$Z_{NORM} = \frac{2}{Z_{1G} - Z_{m1G}} \times Z_{MEAS} - \frac{Z_{1G} - Z_{m1G}}{2};$$

where $Z_{1G}$ is a calibration value for the accelerometer obtained with the diaphragm oriented in a first horizontal position with respect to gravity, and $Z_{m1G}$ is a calibration value for the accelerometer obtained with the diaphragm oriented in a second horizontal position with respect to gravity, flipped 180 degrees from the first horizontal position.

7. The system recited in claim 5, wherein the processor is configured to calculate the offset value $K_G$ according to:

$K_G = O_{1G} - O_{0G}$ for $Z_{NORM} \geq 0$; and $K_G = O_{0G} - O_{m1G}$ for $Z_{NORM} < 0$;

where $O_{1G}$ is a calibration value for the pressure sensor obtained with the diaphragm oriented in a first position horizontally with respect to gravity;

where $O_{m1G}$ is a calibration value for the pressure sensor obtained with the diaphragm oriented in a second position horizontally with respect to gravity, flipped 180 degrees from the first position; and where $O_{0G}$ is a calibration value for the pressure sensor obtained with the diaphragm oriented vertically with respect to gravity.

8. The system recited in claim 7, wherein the measured calibration values comprise a first calibration value determined with the pressure sensor oriented with gravity acting in a first direction normal to the diaphragm and a second calibration value determined with the pressure sensor oriented with gravity acting in a second direction normal to the diaphragm and opposite the first direction.

9. The system recited in claim 1, wherein the processor is configured to calculate the corrected pressure as the measured pressure minus the function of the offset value.

10. The system recited in claim 1, wherein the processor is configured to determine the normalized value of the measured gravity component using calibration values measured via the accelerometer.

* * * * *